Figure 1:
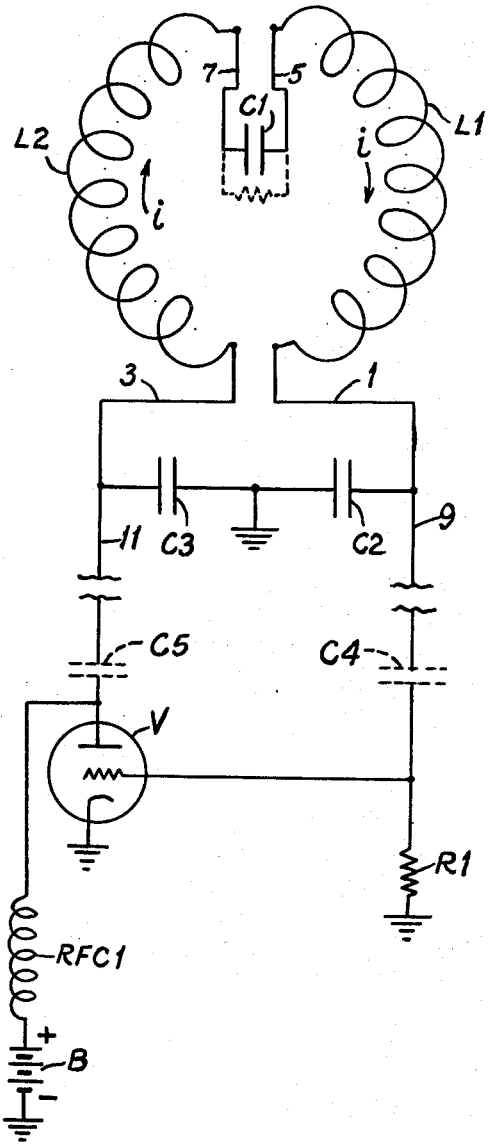

Dec. 3, 1963

M. R. CLELAND 3,113,256

POWER TRANSFER APPARATUS FOR SUPPLYING HIGH
VOLTAGE, HIGH FREQUENCY POWER
TO A REMOTE LOAD

Filed June 22, 1959

3 Sheets-Sheet 1

Marshall R. Cleland,
Inventor.
Koenig and Pope,
Attorneys.

Dec. 3, 1963  M. R. CLELAND  3,113,256
POWER TRANSFER APPARATUS FOR SUPPLYING HIGH
VOLTAGE, HIGH FREQUENCY POWER
TO A REMOTE LOAD
Filed June 22, 1959  3 Sheets-Sheet 2
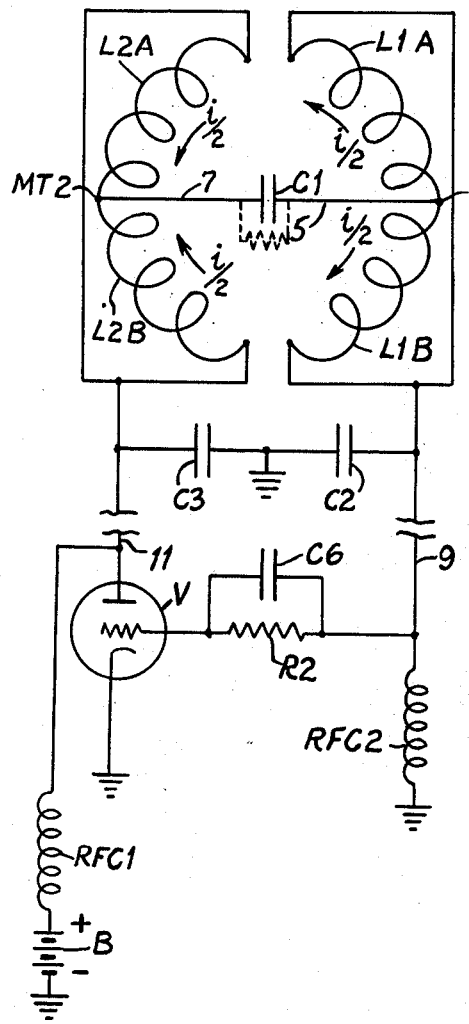
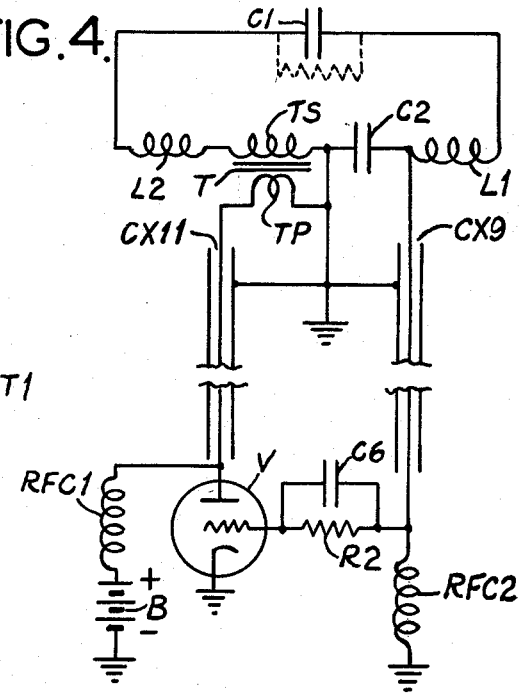
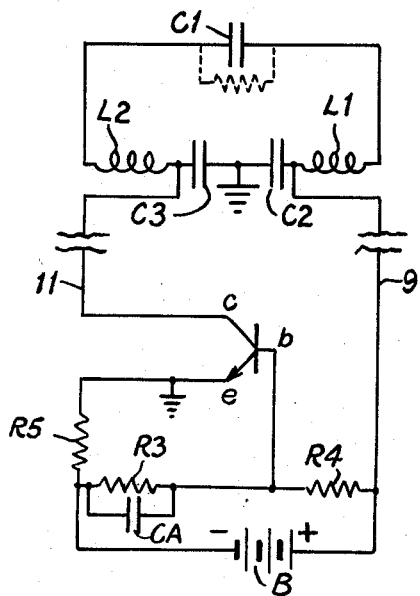
Marshall R. Cleland,
Inventor.
Koenig and Pope,
Attorneys.

Dec. 3, 1963 M. R. CLELAND 3,113,256
POWER TRANSFER APPARATUS FOR SUPPLYING HIGH
VOLTAGE, HIGH FREQUENCY POWER
TO A REMOTE LOAD
Filed June 22, 1959 3 Sheets-Sheet 3

Marshall R. Cleland,
Inventor.
Koenig and Piper,
Attorneys.

United States Patent Office 3,113,256
Patented Dec. 3, 1963

3,113,256
POWER TRANSFER APPARATUS FOR SUPPLYING HIGH VOLTAGE, HIGH FREQUENCY POWER TO A REMOTE LOAD
Marshall R. Cleland, Westbury, N.Y., assignor to Radiation Dynamics, Inc., Westbury, N.Y., a corporation of New York
Filed June 22, 1959, Ser. No. 821,771
13 Claims. (Cl. 321—15)

This invention relates to power transfer apparatus and more particularly to apparatus for supplying high-voltage, high-frequency A.C. power to a load located at a substantial distance from an electrical power source.

Among the several objects of the invention may be noted the provision of power transfer apparatus that will efficiently supply a high-voltage, high-frequency A.C. potential to a point remote from an electrical power source; apparatus of the class described which operates from a relatively low-potential D.C. power source and supplies high-potential, high-frequency A.C. power to a capacitive load at a remote position; and the provision of such apparatus in which the length of the conductors through which high-frequency A.C. power is transferred is not critical and there is low transfer loss. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIGS. 1–7 are circuit diagrams illustrating seven different embodiments of the present invention.

Corresponding reference characters indicate corresponding parts throughout the several views of the drawings.

Frequently, it is necessary to supply high-potential high-frequency A.C. power to a load at a distance remote from the power source. An example of this is the energization of voltage multiplication apparatus such as that disclosed and claimed in my coassigned U.S. Patent 2,875,394 granted February 24, 1959, in which two spaced metallic electrodes must be supplied with A.C. power at potentials in the order of 50–300 kv. at frequencies in the range of 20–300 kc. These metallic electrodes are an integral part of apparatus which generates D.C. potentials in the order of several megavolts, and insulation requirements are such that the electrodes and associated components of the voltage multiplication apparatus are preferably sealed inside a heavy metal container, either evacuated or pressurized with some insulating gas. The efficient supplying of such high-frequency, high-potential A.C. power at levels in the order of 10 kw. or so to the metallic electrodes presents a number of serious problems. The sharply restricted spatial accommodations within the container and the difficulty of dissipating from the heavy sealed metal container the heat generated by conventional high-frequency A.C. generators such as oscillators, etc., make it desirable to generate the A.C. at a substantial distance from the sealed container and to transfer the A.C. to the enclosed metallic electrodes from a remote power source.

In accordance with the present invention, apparatus is now provided which supplies these requirements and overcomes the aforesaid difficulties. By incorporating the capacitive load constituted by said electrodes in a novel loop circuit including at least two inductors and at least one and preferably two reactors (such as capacitors), an oscillator tank circuit is provided, which when supplied with relatively low-voltage A.C. (e.g., from an electronic transducer such as one or more vacuum tubes or transistors), will resonate and cause the circulation of sufficiently high currents through the loop to develop high A.C. voltages across the capacitive load. Moreover, the electronic transducer and the loop circuit preferably constitute a self-excited oscillator having a resonant frequency which is principally a function of the parameters of the loop circuit. Also, loop circuit inductor components are provided in accordance with this invention which are highly efficient and avoid the losses from eddy currents which conventional inductors would induce in the metal container.

Referring now to the drawings, and more particularly to FIG. 1, a capacitive load, such as would be constituted by the metallic shell electrodes of my aforesaid patent, is indicated at reference character C1. This capacitive load is included in a loop circuit comprising a first reactor C2 and a second reactor C3 serially interconnected by wires 1 and 3 between a first inductor L1 and a second inductor L2. C2 and C3 in this embodiment of the invention are capacitors. The remaining terminals of inductors L1 and L2 are interconnected by wires 5 and 7 to the capacitive load C1. A resonant circuit is thus established by these five serially connected components, the resonant frequency of which is dependent principally on the respective parameters of L1, L2, C1, C2 and C3. The interconnection between the two capacitive reactors C2 and C3 is preferably connected at ground potential as indicated. The capacitor C3 has a reactance considerably less than that of C1, and considerably greater than that of C2. Also, the net or series reactance of C3 and C2 is much less than the reactance of C1. Power is supplied to this loop circuit by the common ground connection and the two conductors 9 and 11, electrically connected at the respective junctions formed at the interconnection between L1 and C2, and L2 and C3. Conductors 9 and 11 may be quite long, i.e., in the order of one hundred feet or so. The lengths of these conductors are not critical and are limited only by transmission time considerations. Lines 9 and 11 are connected either directly, or optionally through condensers C4 and C5, to elements of an electronic transducer such as a vacuum tube V, conductor 9 being connected to the control grid and conductor 11 being connected to the anode element of triode V. The control grid of V is also returned to ground through a resistor R1. A relatively low voltage source of D.C. power B (e.g., 3000–10,000 v.) is applied across the anode-cathode circuit of tube V, a radio frequency choke RFC1 being interposed in this circuit to block the flow of R.F. currents through power supply B. The cathode of V may be indirectly heated by a filament (not shown) or may be directly heated by any of the customary arrangements well-known to those skilled in the art. For simplicity, and following conventional practices, the cathode of V is shown as illustrated without filament transformers, center-taps, etc.

Upon energizing the cathode of tube V and applying the D.C. potential of power source B across the plate-cathode circuit of V, the vacuum tube transducer (which operates as a Class C amplifier), loop circuit and associated components will self-oscillate at a resonant frequency determined principally by the values of the components in the loop circuit. An A.C. potential of relatively low level is effectively applied by conductors 9 and 11 across capacitors C2 and C3. The A.C. potential applied by conductor 11 and the ground return across C3 cannot exceed that of the D.C. power supply B. Assuming the parameters of the loop circuit components are such that the capacitance ratios of C1:C3:C2 are 1:20:120, then if 2400 v. A.C. is applied across capacitor C3 approximately the following A.C. potentials will be developed across the other respective capacitive reactor and load C2—400 v.; C1—48,000 v. The circulating current $i$ in the loop circuit is much higher than the current level in conductors 9 and 11, and is a function of the Q of the loop circuit. At high values of Q (e.g., several hundred or one thousand) this circulatory current $i$ is many times higher than the D.C. plate current of tube V. The 400 v. signal developed across C2, which is 180° out of phase with the 2400 v. potential across C3, is fed to the control grid to maintain the self-oscillation. Thus the loop circuit is resonant and acts as an energy storage device from which the capacitive load C1 draws power approximately equal to the sum of the increments of energy delivered to the loop circuit by the transducer V operating as a class C amplifier. It will be understood that other sources of A.C. power (in addition to a self-oscillating transducer circuit which requires a feed-back signal) may be used in accordance with the present invention; e.g., a variable frequency oscillator (adjusted to supply an A.C. potential at a frequency resonant with that of the loop circuit) may be connected to conductors 9 and 11, in which case either one of the reactors C2 or C3 may be omitted from the loop circuit. The capacitance between ground and the respective conductors 9 and 11 is taken into account or compensated by selecting values of C3 and C2 which are less than theoretical by these respective conductor-to-ground capacitances.

It will be noted that inductors L1 and L2 are wound as two arcuate (approximately 180°) sections (preferably air-wound) of a toroid. The heavy magnetic field developed by this two-section toroidal inductance is therefore confined and will not develop eddy currents in any nearby ferromagnetic objects, such as the usual steel pressure vessel in which the loop circuit components would be enclosed. The losses due to eddy currents in such a container, considering the exceedingly high values of circulatory current are prohibitively high if the usual solenoidal type inductors are employed.

Figure 2:
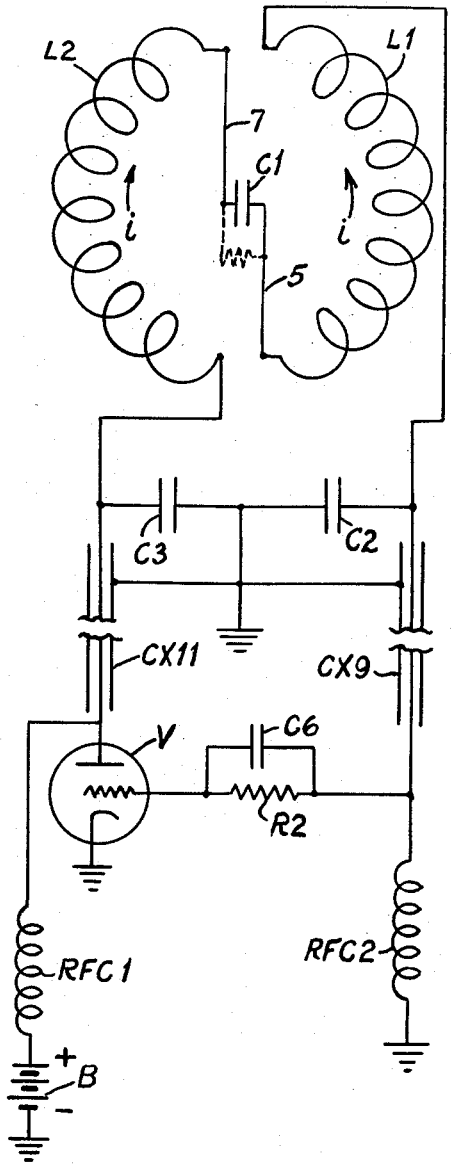
Figure 6:
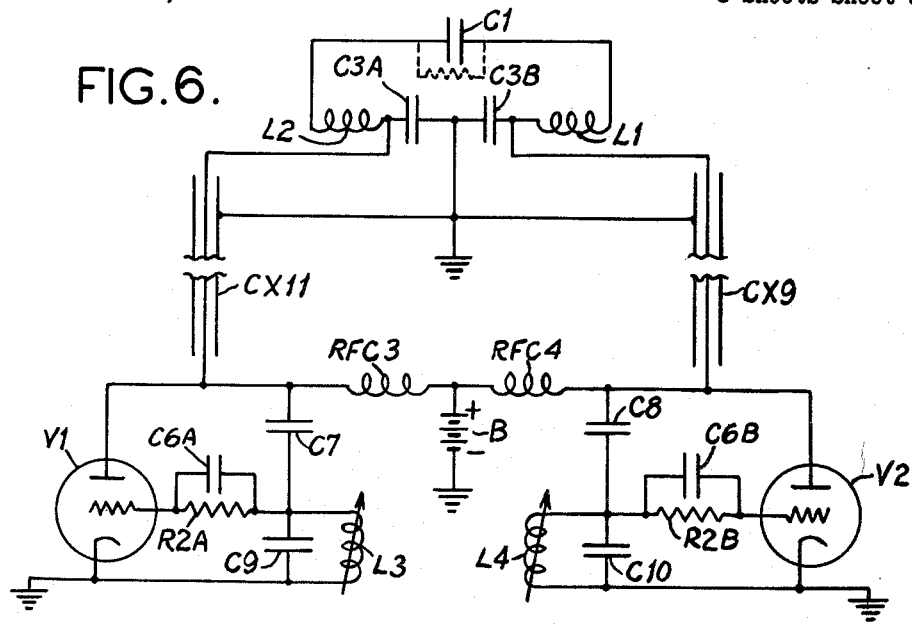

The second embodiment of the present invention, illustrated in FIG. 2, differs in certain aspects from that of FIG. 1. The inductors L1 and L2 in FIG. 1 are wound so that one set of adjacent end terminals is connected by wires 7 and 5 to the capacitive load C1. As the potential developed across C1 may run in the order of 300 kv., an extremely strong R.F. field is created between these adjacent end terminals of inductors L1 and L2. Such a strong R.F. field may cause arcing between these adjacent end terminals of L1 and L2 and cause severe dielectric heating of any supporting material in this gap. The other adjacent end terminals of L1 and L2 which are connected by wires 1 and 3 to C3 and C2 have only a relatively small R.F. field (e.g., 2800 v.) between them. In FIG. 2, the R.F. potentials between adjacent ends of the arcuate toroid sections constituting L1 and L2 are reduced to almost half of that in FIG. 1 by reversing the direction of current flow in L1. This is conveniently accomplished by connecting C1 by wires 5 and 7, not to adjacent pairs of end terminals of inductors L1 and L2 as in FIG. 1, but to terminal ends of L1 and L2 at opposite points on the toroid, i.e., spaced 180° apart. Also the winding sense of L1 is reversed so as to maintain the same magnetic field direction as in FIG. 1.

Another difference between the FIG. 1 and FIG. 2 embodiments is the use of long coaxial cables CX9 and CX11 in place of long insulated conductors 9 and 11 to interconnect the loop circuit to the transducer. Again as in FIG. 1 the capacitances to ground of the conductors, or coaxial cables in this instance, are compensated for by reducing the C2 and C3 capacitances by these values. Also, the grid return of tube V is through an R.F. choke RFC2 and a grid leak comprising a condenser C6 and a resistor R2 is connected in the control grid circuit of V to establish a D.C. grid bias. The operation of this embodiment is substantially identical to that described previously with respect to that of FIG. 1. The addition of C6 permits free choice of the grid leak time constant without affecting the value of C2.

Referring now to FIG. 3, the third embodiment of the present invention is shown. This power transfer apparatus includes a modification in the loop circuit whereby the R.F. insulation problems at the adjacent ends of the arcuate sections of the toroid inductor are completely avoided. Each of the two arcuate sections which comprise inductors L1 and L2 have a mid tap connection MT1 and MT2, respectively, thus dividing each inductor into two portions L1A, L1B and L2A, L2B. L1A and L2A are wound in a reverse direction relative to L1B and L2B respectively to maintain the direction of the circular magnetic field around the axis of the toroid. Thus each inductor L1 and L2 comprises two parallel-connected portions and the adjacent end terminals of L1A and L2A, as well as the adjacent end terminals of L1B and L2B have only the relatively small R.F. potential of the transducer V developed across them. The full R.F. potential across C1 is present at MT1 and MT2 and as these points are separated by 180°, i.e., are on opposite sides of the toroid, R.F. insulation and dielectric heating problems are substantially eliminated. Comparatively, approximately one-half of the R.F. voltage stress is present between the adjacent ends of L1 and L2 in FIG. 2. It is to be understood that to maintain the same inductance and the same resonant frequency in the FIG. 3 embodiment as in that of FIG. 2, the number of turns in each of the inductors must be doubled in FIG. 3. However, as the R.F. current in each of the inductor portoins L1A, L1B, L2A and L2B is $i/2$, the cross sectional area of the wire can be halved without increasing the power losses as compared to FIGS. 1 and 2. The reduction in wire size permits packing twice as many turns in the same winding space so that the toroid of FIG. 3 need not be any larger or heavier than those of FIGS. 1 and 2. It is preferred that litz wire be used in winding the conductor members so as to reduce eddy currents in the wire itself. It has been found advantageous to use a plurality of thin multi-layer pancake windings arranged around the circular axis of the toroid for each of the inductors. The balance of the power transfer apparatus of FIG. 3 is substantially identical to that of FIGS. 1 and 2 and the operation is also comparable.

In FIG. 4, instead of using two condensers C2 and C3 for reactors, C3 is replaced by a secondary TS of a transformer T. Primary winding TP of this transformer is connected between ground potential and coaxial cable conductor CX11. Transformer T is a step-up transformer to match the impedances between the resonant loop circuit and the transducer V. It may be of the ferrite core or laminated core type. In any event the effective reactance (this time inductive, however) is comparable to that of C3, i.e., much less than that of capacitive load C1. Again, as in FIG. 2, the capacitances of the coaxial cables CX9 and CX11 are taken into consideration in selecting the reactance values of C2 and the transformer T.

The FIG. 5 embodiment is similar in structure and operation to those previously described except the electronic transducer in this instance is not a vacuum tube but a transistor TR, which may be of the NPN (as illustrated) or PNP types. Transistor TR is interconnected in a circuit with two resistors R3 and R4 series-connected across battery B to function as a voltage divider, the former resistor being by-passed by a capacitor CA. Resistors R3, R4 and a third resistor R5 connected in the base-emitter circuit stabilize the D.C. operating points of the transistor-oscillator. The operation of the embodiment of FIG. 5 is similar to that of the apparatus of FIGS. 1–4 with relatively low A.C. potentials being produced across capacitors C2 and C3 and with a high A.C. potential being developed across capacitive load C1 by action of the series resonant loop circuit C1, C2, C3, L1 and L2.

In the preceding embodiments a single electronic transducer, such as a vacuum tube or a transistor, was employed and the reactances of reactors C2 and C3 (or T) were unequal. In the FIG. 6 embodiment the transducer comprises a pair of vacuum tubes V1 and V2 utilized in a balanced push-pull configuration, and C3A and C3B are substantially equal capacitive reactors. The voltage step-up ratio between C3A (or C3B) and the capacitive load is still the inverse of the ratios of the capacitances of C3:C1. Coaxial cables CX9 and CX11 are connected to the anodes of V1 and V3 and the 180° out-of-phase signals to the control grids of V1 and V3 are coupled through condensers C7 and C8 (and the respective pairs of shunt-connected capacitors and resistors C6A—R2A and C6B—R2B). An LC tank circuit L3–C9 is connected in the grid-cathode circuit of V1 and a similar LC tank circuit L4–C10 is connected in the grid-cathode circuit of V2, each of these tanks being separately tunable to select the proper push-pull mode of the main resonant circuit and to resonate therewith. Relatively low voltage D.C. power is supplied to the anode-cathode circuits of V1 and V3 respectively from power supply B via R.F. chokes RFC3 and RFC4, respectively. The operation of this power transfer apparatus is similar to that described previously in the other embodiments, except that two tuning adjustments (at L3 and L4) must be made. However, the power transfer apparatus of this embodiment will deliver a greater amount of power to the loop circuit at the same voltage using the same type of transducer than is the case in the preceding embodiments.

Figure 7:
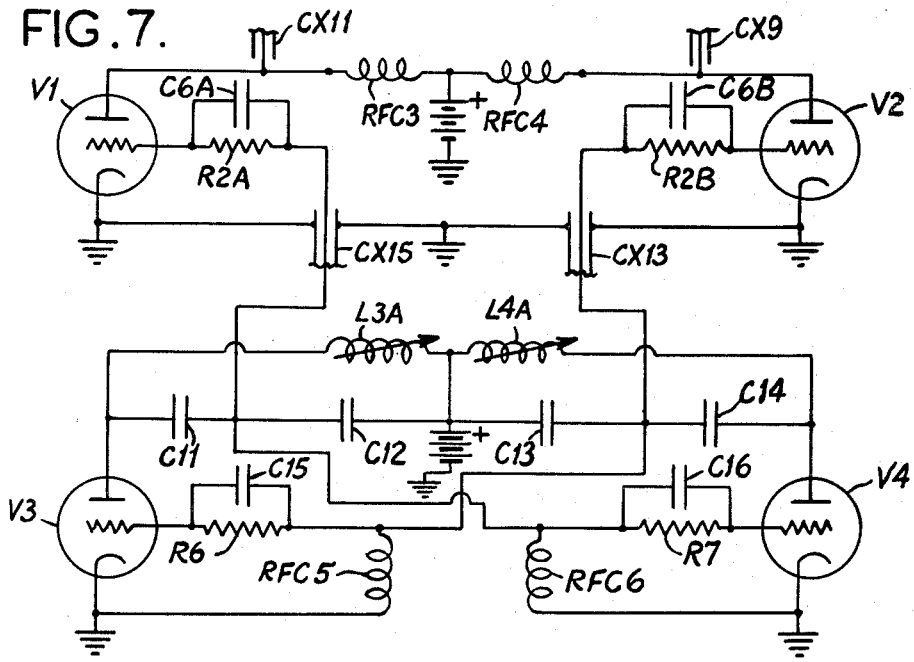

FIG. 7 illustrates an embodiment of this invention in which the control grids of V1 and V2 are driven from a separate control oscillator comprising vacuum tubes V3 and V4, and two adjustable inductors L3A and L4A and four capacitors C11 through C14 connected in a resonant series loop. L3A and L4A are tuned to resonance with the natural resonant frequency of the loop circuit including C1, L1, C3a, C3b, and L2, the tubes V1 and V2 operating as push-pull class C amplifiers. The functioning of this FIG. 7 apparatus is similar to that described above with regard to FIG. 6, etc., all four coaxial cables having their capacitances compensated by proper selection of the values of C3A, C3B, C12 and C13. As in the previous embodiments these cables are functioning circuit elements and do not disadvantageously affect the operation of the circuit as long as the signal transmission times therethrough are short compared to the oscillation period.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:
1. Apparatus for supplying high-voltage high-frequency A.C. power to a capacitive load including a pair of opposed metallic electrodes located at a remote position, said apparatus comprising first and second reactors serially connected between first and second inductors, said capacitive load interconnecting between said inductors to form a loop circuit with said inductors and reactors, the series reactance of said reactors being less than the reactance of said capacitive load, said loop circuit having a resonant frequency which is a function of the capacitance and inductive parameters of said load, said reactors and inductors, said inductors comprising arcuate sections of a toroid, a first conductor interconnected at the electrical junction between said first reactor and said first inductor, a second conductor interconnected at the electrical junction between said second reactor and said second inductor, said conductors being connected to a source of A.C. power having a frequency substantially corresponding to said resonant frequency and located at a position remote from said loop circiut for supplying a first A.C. potential across said conductors whereby a second A.C. potential, higher than said first A.C. potential, is developed across said load, the ratio of said first and second potentials being substantially equal to the ratio of the series reactance of said reactors and the reactance of said capacitive load.

2. Apparatus as set forth in claim 1 in which said first inductor is wound on an arcuate section comprising approximately 180° of said toroid, and in which the second inductor is wound on an arcuate section comprising approximately the other 180° of the toroid, each inductor having first electrical terminals respectively positioned adjacent each other and second electrical terminals positioned adjacent each other, said first terminal of said first inductor being connected to said second conductor, the second terminal of said second inductor being connected to said first conductor, and the remaining two inductor terminals being connected across the capacitive load whereby the potential between the respective pairs of adjacent terminals of said inductors is decreased.

3. Apparatus as set forth in claim 1 in which the first inductor is wound on an arcuate section comprising approximately 180° of said toroid, and in which the second inductor is wound on an arcuate section comprising approximately the other 180° of the toroid, each inductor having first electrical terminals respectively positioned adjacent each other and second electrical terminals respectively positioned adjacent each other, each inductor having a mid-tap connection, said terminals of said first inductor being commonly connected to said second conductor, said terminals of said second inductor being commonly connected to said first conductor, and said mid-tap connections being connected to said capacitive load whereby the potential between the respective adjacent terminals of said inductors is decreased.

4. Apparatus as set forth in claim 3 in which each of said inductors is formed of litz wire.

5. Apparatus for supplying high-voltage high-frequency A.C. power to a capacitive load including a pair of opposed metallic electrodes located at a remote position, said apparatus comprising first and second capacitors serially connected between first and second inductors, said capacitive load interconnected between said inductors to form a loop circuit with said inductors and said capacitors, the series reactance of said capacitors being less than the reactance of said capacitive load, a first conductor interconnected at the electrical junction between said first capacitor and said first inductor, a second conductor interconnected at the electrical junction between said second capacitor and said second inductor, an electronic transducer located at a position remote from said loop circuit and having first and second elements interconnected to said conductors to form an oscillatory circuit with said inductors, capacitors and capacitive load, said oscillatory circuit having a resonant frequency which is a function of the capacitive and inductive parameters of said inductors, capacitors and capacitive load, said transducer adapted to impress a first A.C. potential across said conductors whereby a second A.C. potential, higher than said first A.C. potential, is developed across said load, the ratio of said first and second potentials being substantially equal to the ratio of the series reactance of said capacitors and said capacitive load.

6. Apparatus as set forth in claim 5 wherein said inductors comprise arcuate sections of a toroid, said first inductor being wound on an arcuate section comprising approximately 180° of said toroid, and said second inductor being wound on an arcuate section comprising approximately the other 180° of the toroid, each inductor having first electrical terminals respectively positioned adjacent each other and second electrical terminals respectively positioned adjacent each other, said first terminal of said first inductor being connected to said second conductor, the second terminal of said second inductor being connected to said first conductor, and the remaining two inductor terminals being connected across the capacitive load whereby the potential between the respective pairs of adjacent terminals of said inductors is decreased.

7. Apparatus as set forth in claim 5 wherein said inductors comprise arcuate sections of a toroid, said first inductor being wound on an arcuate section comprising approximately 180° of said toroid, and said second inductor being wound on an arcuate section comprising approximately the other 180° of the toroid, each inductor having first electrical terminals respectively positioned adjacent each other and second electrical terminals respectively positioned adjacent each other, each inductor having a mid-tap connection, said terminals of said first inductor being commonly connected to said second conductor, said terminals of said second inductor being commonly connected to said first conductor, and said mid-tap connections being connected to said capacitive load whereby the potential between the respective terminals of said inductors is decreased.

8. Apparatus for supplying high-voltage high-frequency A.C. power to a capacitive load including a pair of opposed metallic electrodes located at a remote position, said apparatus comprising a transformer having primary and secondary windings, said secondary windings being connected in series with a reactor between first and second inductors, said capacitive load interconnected between said inductors to form a loop circuit with said inductors, said secondary winding and said reactor, the series reactance of said secondary winding and said reactor being less than the reactance of said capacitive load, a first conductor interconnected to said primary winding, a second conductor interconnected at the electrical junction between said reactor and said second inductor, an electronic transducer located at a position remote from said loop circuit and having first and second elements interconnected to said conductors to form an oscillatory circuit with said inductors, said transformer, said reactor and said capacitive load, said oscillatory circuit having a resonant frequency which is a function of the capacitive and inductive parameters of said loop circuit, said transducers adapted to impress a first A.C. potential across said conductors whereby a second A.C. potential, higher than said first A.C. potential, is developed across said load, the ratio of said first and second potentials being substantially equal to the ratio of the reactance of said secondary winding in series with said reactor and said capacitive load.

9. Apparatus as set forth in claim 5 in which said electronic transducer is a transistor having collector, emitter and base elements, and which further includes a source of D.C. power, said electrical conductors being connected to two of said transistor elements, and the D.C. power source being interconnected between the third transistor element and one of said other transistor elements.

10. Apparatus as set forth in claim 5 in which the electronic transducer is a vacuum tube having anode, control grid and cathode elements and which further includes a source of D.C. power, said first conductor being connected to said anode, said second conductor being connected to the control grid, and the D.C. power source being connected across the anode and a common connection with said cathode and the electrical junction between said first and second capacitors.

11. Apparatus as set forth in claim 10 in which each of said conductors is a coaxial cable having a shield which is electrically connected to said junction between said two capacitors.

12. Apparatus as set forth in claim 5 in which said electronic transducer is constituted by a pair of vacuum tubes each having anode, control grid and cathode elements, said conductors being connected to said anodes respectively, said control grids being connected to a source of low-potential A.C. power having a frequency substantially resonant with that of said loop circuit, and a source of D.C. power for said vacuum tubes interconnected to apply a D.C. potential across the anode-cathode circuits thereof.

13. Apparatus as set forth in claim 12 in which said source of low-potential A.C. power is an oscillator adapted to produce a signal having a frequency substantially resonant with that of said loop circuit.

References Cited in the file of this patent

UNITED STATES PATENTS

| | | |
|---|---|---|
| 2,149,387 | Brown | Mar. 7, 1939 |
| 2,272,851 | Ramsay | Feb. 10, 1942 |
| 2,429,656 | Willoughby | Oct. 28, 1947 |
| 2,483,189 | Eaglesfield | Sept. 27, 1949 |
| 2,523,027 | Kellogg et al. | Sept. 19, 1950 |
| 2,563,098 | Brown | Aug. 7, 1951 |
| 2,605,310 | White | July 29, 1952 |
| 2,724,055 | Bliss | Nov. 15, 1955 |
| 2,843,815 | Driver | July 15, 1958 |

FOREIGN PATENTS

| | | |
|---|---|---|
| 941,202 | Germany | Apr. 5, 1956 |

OTHER REFERENCES

Principles of Radar, by M.I.T. Radar School Staff; 2nd edition, 1946, McGraw-Hill Book Co., Inc.; pp. 7–15 to 7–21.

Advantages of Toroidal Transformers in Communication Engineering, Lawson; Tele-Tech, May 1950.